United States Patent

Ballard et al.

[11] Patent Number: 5,180,799
[45] Date of Patent: Jan. 19, 1993

[54] PROCESS FOR POLYMERIZING METHACRYLIC ACID ESTER MONOMERS

[75] Inventors: Denis G. H. Ballard, Chester; David M. Haddleton, Helsby; David L. Twose, Tarporley, all of England

[73] Assignee: Imperial Chemical Industries PLC, London, England

[21] Appl. No.: 631,016

[22] Filed: Dec. 21, 1990

[30] Foreign Application Priority Data

Dec. 22, 1989 [GB] United Kingdom ............... 8929024

[51] Int. Cl.$^5$ .............................. C08F 4/52
[52] U.S. Cl. .............................. 526/177; 526/176; 526/178; 526/328
[58] Field of Search .................. 526/176, 177, 178

[56] References Cited

U.S. PATENT DOCUMENTS

| | | | |
|---|---|---|---|
| 3,278,508 | 10/1966 | Kahle et al. | 526/177 X |
| 3,448,092 | 6/1969 | Chiang | 526/177 |
| 3,631,006 | 12/1971 | Hawkins | 526/177 |
| 3,716,495 | 2/1973 | Hsieh | 526/177 X |
| 4,473,661 | 8/1984 | Hall | 502/153 |
| 4,518,753 | 5/1985 | Richards et al. | 526/177 |
| 4,889,900 | 12/1989 | Du Bois | 526/177 |
| 4,933,401 | 6/1990 | Hattori et al. | 526/175 |

FOREIGN PATENT DOCUMENTS 1-193312 8/1989 Japan .

Primary Examiner—Joseph L. Schofer
Assistant Examiner—M. Nagumo
Attorney, Agent, or Firm—Cushman, Darby & Cushman

[57] ABSTRACT

A process for addition polymerization of vinylic (in particular methacrylic) monomers at a temperature in the range of $-20°$ to $60°$ c., in the presence of a catalyst comprising:
(a) a first component of empirical formula (I):

$$MT \qquad (I)$$

wherein
M is an alkali metal atom; and
T is bulky hydrocarbyl which contains at least 4 carbon atoms and is optionally substituted by one or more pendent substituents, or hetero-substituted hydrocarbyl, each of which is inert in the process conditions; and
(b) a (co-catalyst) second component comprising a compound of empirical formula (II):

$$Q(X_m)(Y_n)Z_p \qquad (II)$$

wherein
Q is Al, B or Zn;
m, n and p are each 0 or an integer such that $(m+n+p)=2$ or 3 (depending on the appropriate valency of Q; and
X, Y and Z are each independently optionally substituted bulky hydrocarbyl, or
X and Y together are optionally substituted hydrocarbadiyl, and Z is optionally substituted bulky hydrocarbyl,
all of which groups are inert in the process conditions.

10 Claims, No Drawings

PROCESS FOR POLYMERIZING METHACRYLIC ACID ESTER MONOMERS

This invention relates to polymerisation catalysts, in particular to catalysts for addition polymerisation, in particular of vinylic monomers, and to a polymerisation process, in particular the addition polymerisation of vinylic monomers. (The term 'polymerisation' herein includes all types of polymerisation, including homo- and co-polymerisation, and the term 'monomer' herein includes a reference to oligomers).

It is desirable to be able to produce high molecular weight polymers with a low molecular weight distribution by catalysed addition polymerisation, at room temperature, in particular of vinylic (including methacrylic) monomers. It is also desirable to be able to produce polymers with a relatively high glass transition temperature $T_g$. It has also been a prejudice in the art that the specific tacticity of the product polymer must be closely controlled and maximised in order to achieve desirable product properties.

Hitherto all this has been difficult to achieve, especially in the case of methacrylics polymerised in the presence of organolithium compounds (optionally with organoaluminium species), owing to the tendency of known catalysed systems to suffer from lack of controllability of the desirable properties of the products as the process temperature is raised. Many polymerisations of this type have therefore disadvantageously had to be carried out at low temperatures, eg between $-60°$ and $-100°$ C.

Surprisingly, we have found that
a) too great a specific tacticity in the product polymer may be industrially disadvantageous, and
b) the catalysts and the processes of the present invention may be used advantageously at conveniently high temperatures, to produce high molecular weight polymers with a low molecular weight distribution and a syndiotacticity typically <85%, all leading to a product with unexpectedly advantageous physical properties, including a relatively high $T_g$.

That is, the desirable and advantageous polymer properties may be readily controlled, notwithstanding that the process is carried out at relatively high temperatures, such as 0° to 50° C.

The process is well suited to the polymerisation of vinylics, in particular of methacrylics.

Accordingly, the present invention in a first aspect provides a process for addition polymerisation of vinylic (in particular methacrylic) monomers at a temperature in the range of $-20°$ to $60°$ C., in the presence of a catalyst comprising:

(a) a first component of empirical formula (I):

$$MT \qquad (I)$$

wherein
M is an alkali metal atom; and
T is bulky hydrocarbyl which contains at least 4 carbon atoms and is optionally substituted by one or more pendent substituents, or hetero-substituted hydrocarbyl, each of which is inert in the process conditions of the present invention; and (b) a (co-catalyst) second component comprising a compound of empirical formula (II):

$$Q(X_m)(Y_n)Z_p \qquad (II)$$

wherein
Q is Al, B or Zn;
m, n and p are each 0 or an integer such that $(m+n+p)=2$ or 3 (depending on the appropriate valency of Q; and
X, Y and Z are each independently optionally substituted bulky hydrocarbyl, or
X and Y together are optionally substituted hydrocarbadiyl, and Z is optionally substituted bulky hydrocarbyl,
all of which groups are inert in the process conditions of the present invention.

In a preferred group of components within those of formula (II):
X, Y and Z are each independently optionally substituted bulky hydrocarbyl, or
and X and Y together are optionally substituted hydrocarbadiyl, and Z is optionally substituted bulky hydrocarbyl,
all of which groups are inert in the process conditions of the present invention and contain at least 4 carbon atoms.

In a second preferred group of components within those of formula (II) at least one of X, Y and Z contains at least two carbon atoms and is substituted by at least one hetero-atom.

When used herein in relation to hydrocarbyl groups within the catalyst components of formula (I) and (II), and (III) as described hereinafter, the term 'bulky' means that the group when aliphatic or araliphatic other than aryl-substituted methyl or ethyl,
  i) contains at least 9 carbon atoms,
  ii) is bound to M or Q respectively by a secondary or tertiary carbon atom (thus including cycloalkyl), and/or
  iii) has a high degree of branching (e.g., neopentyl), or is aryl or aryl-substituted methyl or ethyl (including arylene-disubstituted methyl).

The term 'optionally substituted' herein in relation to T, X, Y and Z, and $X^1$, $Y^1$ and $Z^1$ groups as hereinafter defined includes substitution by pendent mono-or di-valent groups.

The term includes substitution by hetero-atoms. Such atoms include O, N, P and As, in particular as a substituent in the 1-position, i.e., directly bonded to M.

The present invention in a second aspect provides a second process for addition polymerisation of vinylic (in particular methacrylic) monomers, which is characterised by being carried out in the presence of a catalyst comprising:
(a) a first component of formula (I):

$$MT \qquad (I)$$

wherein
M is an alkali metal atom; and
T is bulky hydrocarbyl which contains at least 4 carbon atoms and is optionally substituted by one or more pendent substituents, or hetero-substituted hydrocarbyl, each of which is inert in the process conditions of the present invention and ; and (b) a (co-catalyst) second component comprising a compound of empirical formula (III):

$$Q(X^1{}_m)(Y^1{}_n)Z^1{}_p \qquad (III)$$

wherein
Q is Al, B or Zn;

m, n and p are each 0 or an integer such that $(m+n+p)=2$ or 3 (depending on the appropriate valency of Q; and $X^1$, $Y^1$ and $Z^1$ are each independently optionally substituted bulky hydrocarbyl, or $X^1$ and $Y^1$ together are optionally substituted hydrocarbadiyl, and $Z^1$ is optionally substituted bulky hydrocarbyl, all of which groups are inert in the process conditions of the present invention.

In a preferred group of components within those of formula (III):

$X^1$, $Y^1$ and $Z^1$ are each independently optionally substituted bulky hydrocarbyl, or $X^1$ and $Y^1$ together are optionally substituted hydrocarbadiyl, and $Z^1$ is optionally substituted bulky hydrocarbyl, all of which groups are inert in the process conditions of the present invention and contain at least 5 carbon atoms.

In a second preferred group of components within those of formula (III) at least one of $X^1$, $Y^1$ and $Z^1$ contains at least two carbon atoms and is substituted by at least one hetero-atom.

In the first component a) of the catalyst, of formula (I), such T also includes hydrocarbapolyyl (which may be optionally substituted as hereinbefore defined) bearing a corresponding number of M atoms which may be the same or different, although they are often the same.

The co-catalyst component in the processes of the first and second aspects of the present invention may consist of a single compound of formula (II) or (III) respectively, or it may comprise a plurality of such respective compounds.

Where such a second component contains a plurality of such compounds, inter-species exchange of or bridging by the organic substituent groups on Q as defined may occur.

It is believed to be likely that the compound of formula (I) per se is not the initiator, and the compound(s) of formula (II) or (III) may thus form a complex with that of formula (I) in use. In such case free compounds of the formula (I), (II) or (III) may be present depending on the molar ratios of the catalyst components which are used.

Additionally, as described further hereinafter, it is possible to produce the compound of formula (I) (e.g., by reacting an aralkene with a (bulky alkyl)lithium species, and to mix it in situ without isolation with the component of formula (II) or (III) to form the catalyst.

This order of addition may be reversed, e.g., the (bulky alkyl)lithium may be mixed with the component of formula (II) or (III) and the aralkene added to the mixture in situ without isolation to generate a catalyst of the present invention. This catalyst is demonstrably different from the combination of the (bulky alkyl)lithium and the component of formula (II) or (III), but not necessarily the same as that resulting from the first order of mixing.

It is therefore emphasised that the formulae (II) and (III) are empirical only.

It will be seen from the foregoing that a group of catalyst second (co-catalyst) components of formula (II) consists of those of formula (III) as hereinbefore defined.

The present invention in a third aspect provides a catalyst comprising a component of formula (I) and a component of formula (III).

It will be appreciated that a group of first components of formula (I) for use in the present processes is of formula (IA):

$$MT^1 \qquad (IA)$$

wherein

M is an alkali metal atom; and $T^1$ is hydrocarbyl which is substituted in the position directly bonded to M by an atom A, where A is O, N, P or As, is inert in the process conditions of the present invention, and is optionally further substituted as hereinbefore defined.

$T^1$ is preferably bulky and contains at least 3 carbon atoms.

The present invention in a preferred embodiment of its third aspect provides a catalyst comprising a component of formula (IA) and a preferred component of formula (III) as described hereinbefore.

It will be appreciated that a group of second components of formula (II) for use in the present processes is of formula (IIA):

$$Q(X^2{}_m)(Y^2{}_n)Z^2{}_p \qquad (IIA)$$

wherein $X^2$, $Y^2$ and $Z^2$ are each independently optionally substituted bulky hydrocarbyl, or $X^2$ and $Y^2$ together are optionally substituted hydrocarbadiyl, and $Z^2$ is optionally substituted bulky hydrocarbyl, all of which groups are inert in the process conditions of the present invention, and at least one of which is substituted in the or each position directly bonded to Q by an atom A', where A' may be the same or different in each position and is O, N, P or As.

The present invention in a preferred embodiment of its third aspect provides a catalyst comprising a component of formula (I) and a preferred component of formula (IIA) as described hereinbefore.

It will also be appreciated that bonds between M and Q and at least one of T, X, Y, Z, $X^1$, $Y^1$ and $Z^1$ respectively may exchange in the present processes.

However, the groups themselves should be inert in the process conditions.

For this reason such groups, even when described as optionally substituted, are often unsubstituted by monovalent pendent substituents, although T, X, Y, or Z are often substituted by at least one heteroatom A as hereinbefore defined.

In the process of the first aspect of the present invention, and in the first component a) of the catalyst:

Favoured M is Li or Na, in particular Li.

Suitable T optionally substituted bulky hydrocarbyl as defined include optionally substituted bulky alkyl, aralkyl other than aryl-substituted methyl or ethyl and alkenyl, and cycloalkyl (including polycycloalkyl), cycloalkenyl (including polycycloalkenyl) and aryl.

Suitable T optionally substituted bulky hydrocarbyl as defined also include aryl-substituted (including arylene-disubstituted) methyl or ethyl.

Suitable T hetero-substituted hydrocarbyl include hetero-substituted alkyl, aralkyl other than aryl-substituted methyl or ethyl and alkenyl, and cycloalkyl (including polycycloalkyl), cycloalkenyl (including polycyclo- alkenyl) and aryl.

Suitable T hetero-substituted hydrocarbyl as defined also include aryl-substituted (including arylene-disubstituted) hetero-substituted methyl or ethyl.

Suitable T optionally substituted bulky alkyl, and such alkyl as a component within T bulky aralkyl other than aryl-substituted methyl or ethyl, include optionally substituted $C_{9-20}$ alkyl groups.

They also include optionally substituted secondary or tertiary and/or highly branched $C_{4-20}$ alkyl groups, including such $C_{5-8}$ alkyl groups.

Bulky alkyl groups thus include decyl, lauryl, 4-methylhex-2-yl, 4,4-dimethylpent-2-yl, 3,3-dimethylpent -2-yl, 4-methylpent-2-yl, 3,3-dimethylbut-2-yl and 3-methylpentyl, especially 3-methylpentyl, 4-methylhex-2-yl and 4,4-dimethylpent-2-yl.

Bulky alkyl groups thus also include 3-methylbut -2-yl, 2,2-dimethylpropyl (neopentyl), sec.-butyl, isobutyl and tert.-butyl, especially tert.-butyl.

Such alkyl groups are often unsubstituted by monovalent pendent substituents, although (as described further hereinafter) often substituted by a heteroatom A as hereinbefore defined.

Suitable T optionally substituted aralkyl other than aryl-substituted methyl or ethyl include any of the foregoing $C_{4-8}$ alkyl groups substituted by the suitable aryl groups recited below.

Suitable T optionally substituted aralkyl of this type include in particular 1- or 2-alkyl, respectively
a) 1- or 2-substituted or
b) 1,1- or 2,2-disubstituted by such aryl groups, and thus include 4-methyl-2-phenylhex-2-yl, 4,4-dimethyl-2-phenylpent-2-yl, 3,3-dimethyl -2-phenyl-pent-2-yl, 4-methyl-2-phenylpent -2-yl, 3,3-dimethyl-2-phenylbut-2-yl, 3-methyl-2-phenylpentyl, especially 4-methyl-2-phenyl-hex-2-yl and 4,4-dimethyl -2-phenylpent-2-yl and 3-methyl-2-phenyl-but-2-yl.

Suitable T optionally substituted aralkyl of this type thus also include 3-methyl-1,1-diphenylpentyl, 3,3-dimethyl-1,1-diphenylbutyl, 2,2-dimethyl -1,1-diphenylbutyl, 3-methyl-1,1-diphenylbutyl, 2,2-dimethyl-1,1-diphenylpropyl and 2-methyl-1,1-diphenylbutyl, especially 3-methyl-1,1-diphenylpentyl and 3,3-dimethyl-1,1-diphenylbutyl. The phenyl moieties may optionally be substituted by alkyl, e.g., methyl, or bulky alkyl, e.g., tert.-butyl, in the 4'-position.

Such T also include polyalkylenearene (which may be optionally substituted as hereinbefore defined) bearing a corresponding number of M atoms which may be the same or different, but which are often the same.

Such T thus include the following in which the alkylene substituents may be in the 1,3 and 1,4 positions, often the 1,3 positions: bis(4-methylhexane -2,2-diyl)-benzene, bis(4,4-dimethylpentane2,2-diyl)benzene and bis(3,3-dimethylpentane-2,2-diyl)benzene, bis(4-methylpentane-2,2-diyl)benzene, bis(3,3-dimethylbutane-2,2-diyl)benzene, bis(3-methylpentane-2,2-diyl)benzene and bis(3-methyl-butane -2,2-diyl)benzene, especially bis(4-methylhexane-2,2-diyl)benzene and bis(4,4-dimethylpentane-2,2-diyl)benzene.

Such T further include bis(3,3-dimethyl-1-phenylbutane-1,1-diyl)benzene, bis(3-methyl-1-phenyl-pentane-1,1-diyl)benzene, bis(2,2-dimethyl-1-phenyl-propane-1,1-diyl)benzene, bis(2-methyl-1-phenylbutane-1-diyl)-benzene and bis(2-methyl-1-phenylpropane -2,2-diyl)-benzene, especially bis(3-methyl-1-phenylpentane-2,2-diyl)benzene and bis(3,3-dimethyl -1-phenylbutane-2,2-diyl)benzene. The phenyl moieties may optionally be substituted by lower alkyl, such as methyl, e.g., in the 4'-position.

Suitable T optionally substituted bulky alkenyl include optionally substituted $C_{4-8}$ alkenyl.

Suitable T optionally substituted cycloalkyl include such $C_{5-8}$ cycloalkyl, for example cyclohexyl.

Such cycloalkyl groups are often unsubstituted by monovalent pendent substituents, although often substituted by a heteroatom A as hereinbefore defined.

Suitable T optionally substituted cycloalkyl also include polycycloalkyl such as adamantyl. Such cycloalkyl groups are often unsubstituted by monovalent pendent substituents, although often substituted by a heteroatom A as hereinbefore defined.

Suitable T optionally substituted cycloalkenyl include such $C_{5-8}$ cycloalkenyl, for example cyclohex-1-enyl, which are often unsubstituted.

Suitable T optionally substituted cycloalkenyl also include polycycloalkenyl such as dicyclopentadienyl and norbornenyl.

Such cycloalkenyl groups are often unsubstituted by monovalent pendent substituents, although often substituted by a heteroatom A.

Suitable T optionally substituted aryl include phenyl optionally substituted by inert substituents, such as alkyl and aryl, but often unsubstituted.

Suitable T also include aryl-substituted methyl or ethyl (including arylene-disubstituted methyl), such as benzyl and fluorenyl.

Suitable such T also includes monomer units within an oligomeric moiety, bearing a corresponding number of M atoms which may be the same or different, although they are often the same. For example it may form part of a polystyryl polylithium, such as distyryl dilithium.

Such T may be optionally substituted in the phenyl or phenylene ring(s), but is more often unsubstituted by pendent substituents. However, it is often substituted by a heteroatom A as hereinbefore defined in the methyl or ethyl moiety.

Amongst hetero-substituted T as hereinbefore defined, suitable T hetero-substituted alkyl (and preferably bulky alkyl), and such alkyl as a component within T hetero-substituted aralkyl other than such aryl-substituted methyl or ethyl, include optionally substituted $C_{9-20}$ alkyl groups.

Such alkyl substituted by a heteroatom A as hereinbefore defined thus include: methoxy and tert-butoxy; methoxy- and ethoxy- poly(ethoxy), -poly(propoxy), -poly(isopropoxy) and -poly(butoxy); didecylamino, dilaurylamino, bis(trimethylsilyl)amino, bis(2-ethylhexyl)amino, dicyclohexylamino, di(4-methylpent -2-yl)amino, bis(3,3-dimethylbut-2-yl)amino, bis (3-methylpentyl)amino, bis(3-methylbut-2-yl)amino, bis(2.2-dimethylpropyl)amino (dineopentylamino). di-sec.-butylamino, diisobutylamino, di-tert.-butylamino, diisopropylamino and dimethylamino, especially diisopropylamino, bis(trimethylsilyl)amino, bis(2-ethylhexyl)amino and dicyclohexylamino.

Alkyl substituted by a heteroatom A as hereinbefore defined thus include in particular methoxy. tert-butoxy and diisopropylamino.

Such alkyl (and preferably bulky alkyl) substituted by a heteroatom A as hereinbefore defined may also be further substituted, e.g., by at least one further heteroatom which may be of the same species as A or different (but often the same) and/or (in particular when A is N) by an oxo group.

Such groups thus include N-alkyl-N',N'-alkylureido species, in which the N-alkyl group is preferably a bulky alkyl group as hereinbefore defined, such as N-tert.-butyl-N',N'-dimethylureido, N-(3-methylbutyl- N',N'-dimethylureido, N-tert.-butyl -N',N'-diisopropylureido and N-sec.-butyl-N',N'-diisopropylureido.

Such further substituted T also includes corresponding hydrocarbapolyyl (which may be optionally substituted as hereinbefore defined) bearing a corresponding number of M atoms which may be the same or different, although they are often the same.

Such groups thus include: oxypoly(alkoxy) species, such as oxypoly(ethoxy) and oxypoly(propoxy), oxypoly(isopropoxy), and oxypoly(butoxy); and $C_{4-8}$ alkylenebis(N-alkyl-N',N'-alkyl-ureido) species, in which each N-alkyl group is preferably a bulky alkyl group as hereinbefore defined, such as butylene-bis(N-tert.-butyl-N',N'-dimethylureido), hexylenebis(N-(3-methyl-butyl-N',N'-dimethylureido), hexylenebis(N-tert.-butyl-N',N'-diisopropylureido) and butylenebis(N-sec.-butyl-N',N'-diisopropylureido, especially hexylenebis(N-tert.-butyl-N',N'-diisopropylureido).

T cycloalkenyl groups substituted by a heteroatom A include heteropolycycloalkenyl such as oxa and aza derivatives of dicyclopentadienyl and norbornenyl, often unsubstituted by monovalent groups.

Suitable hetero-substituted T also include aryl-substituted hetero-substituted methyl or ethyl (including arylene-disubstituted methyl), such as phenoxy, benzoxy and 9-carbazolyl. Such groups may be substituted by bulky inert substituents, such as bulky alkyl and aryl, e.g., tert.-butyl and phenyl, in particular in the 2, 4 and/or 6 positions of a phenyl nucleus.

In the second component b) of the catalyst of formula (II):

Favoured Q is Al or B, preferably Al.

Suitable X, Y and Z optionally substituted bulky hydrocarbyl as defined include optionally substituted bulky alkyl, aralkyl other than aryl-substituted methyl, cycloalkyl (including polycycloalkyl) and cycloalkenyl (including polycycloalkenyl) and aryl.

Suitable X, Y and Z optionally substituted hydrocarbyl as defined also include optionally substituted aryl-substituted methyl.

Suitable X, Y and Z hetero-substituted hydrocarbyl as defined include hetero-substituted alkyl, aralkyl other than aryl-substituted methyl, cycloalkyl (including polycycloalkyl) and cycloalkenyl (including polycycloalkenyl) and aryl.

Suitable X, Y and Z hetero-substituted hydrocarbyl as defined also include hetero-substituted aryl-substituted methyl.

Optionally substituted alkyl is suitable as an X, Y or Z group and as a component within X, Y or Z aralkyl other than aryl-substituted methyl.

Suitable bulky alkyl include optionally substituted $C_{9-20}$alkyl groups and optionally substituted secondary or tertiary and/or highly branched $C_{4-20}$ alkyl groups, including such $C_{4-8}$ alkyl.

Suitable such groups are as described for corresponding groups T hereinbefore.

Bulky alkyl groups thus include in particular iso-butyl and tert.-butyl, but especially iso-butyl. Such alkyl groups are often unsubstituted.

Suitable X, Y and Z optionally substituted bulky aralkyl include any of the foregoing $C_{4-8}$ alkyl groups substituted by the suitable aryl groups recited below.

Suitable X, Y and Z optionally substituted bulky alkenyl include optionally substituted $C_{4-8}$ alkenyl.

Suitable X, Y and Z optionally substituted cycloalkyl include such $C_{5-8}$ cycloalkenyl, for example cyclohexyl, and polycycloalkyl such as adamantyl. Such cycloalkyl groups are often unsubstituted.

Suitable X, Y and Z optionally substituted cycloalkenyl include such $C_{5-8}$ cycloakenyl, for example cyclohex-1-enyl.

Suitable X, Y and Z optionally substituted cycloalkenyl include polycycloalkenyl such as dicyclopentadienyl and norbornenyl. Such cycloalkenyl groups are often unsubstituted.

Suitable X, Y and Z optionally substituted aryl include phenyl optionally substituted by substituents inert in the desired polymerisation conditions, which include alkyl and aryl. Such aryl groups are however often unsubstituted.

Suitable X, Y and Z also include aryl-substituted methyl and ethyl, such as benzyl, preferably substituted in the 2, 4 and/or 6 positions of the phenyl ring, by bulky inert substituents, such as bulky alkyl and aryl, e.g., tert.-butyl and phenyl.

Such groups also include arylene-disubstituted methyl, such as fluorenyl.

As described further hereinafter, such groups are often substituted by a heteroatom A' as hereinbefore defined in the methyl or ethyl moiety.

Amongst hetero-substituted X, Y and Z as hereinbefore defined, suitable X, Y and Z hetero-substituted alkyl (and preferably bulky alkyl), and such alkyl as a component within X, Y and Z hereto-substituted aralkyl other than such aryl-substituted methyl or ethyl, include optionally substituted $C_{9-20}$ alkyl groups.

Such alkyl substituted by a heteroatom A as hereinbefore defined thus include: 4,4-dimethylpent-2-oxy, 3-methylbut-2-oxy, 2,2-dimethylpropoxy (neopentoxy), sec.-butoxy, isobutoxy and tert.-butoxy, especially tert.-butoxy; methoxy- and ethoxy-poly(ethoxy), -poly(-propoxy), -poly(isoprop- oxy) and -poly(butoxy); and those amino species recited hereinbefore for T.

Suitable hetero-substituted X, Y and Z also include N-alkyl-N',N'-alkyl-ureido species, in which each N-alkyl group is preferably a bulky alkyl group as hereinbefore defined, such as N-tert.-butyl-N',N'-dimethylureido, N-3-methylbutyl-N',N'-di- methylureido, N-tert.-butyl-N',N'-diisopropylureido) and N-sec.-butyl-N',N'-diisopropylureido.

X, Y and Z cycloalkenyl groups substituted by a heteroatom include those recited hereinbefore for T.

Suitable hetero-substituted X, Y and Z also include aryl-substituted hetero-substituted methyl or ethyl (including arylene-disubstituted methyl), such as phenoxy, benzoxy and 9-carbazolyl, in particular phenoxy. Such groups may be substituted by bulky inert substituents, such as bulky alkyl and aryl, eg tert.-butyl and phenyl, in particular in the 2 and/or 6 positions of a phenyl nucleus. Such groups may also be substituted by other inert substituents, such as alkyl, alkoxy and aryl, eg methyl and methoxy, in particular in the 4 position of a phenyl nucleus.

Any two of X, Y and Z may together be optionally substituted hydrocarbadiyl. Such a group is referred to generally hereinafter as an '(X+Y) group'.

Suitable (X+Y) optionally substituted hydrocarbadiyl exclude 1,1-diyl.

Suitable (X+Y) optionally substituted hydrocarbadiyl include optionally substituted alkanediyl, alkenediyl, alkapolyenediyl and arylene.

Suitable (X+Y) optionally substituted alkadiyl include α, ω-$C_{4-6}$alkanediyl.

Such groups are often not further substituted.

Suitable (X+Y) optionally substituted alkenediyl and alkapolyenediyl include α,ω- C$_{4-6}$ alkenediyl, α,ω-C$_{4-6}$ alkadienediyl and α,ω-hexatrienediyl. Such groups are often not further substituted.

Suitable (X+Y) optionally substituted arylene groups include biphenyl-2,2'-diyl optionally substituted as for X, Y and Z aryl. Such groups may be substituted in the aryl moiety by alkyl but are often unsubstituted.

In the process of the second aspect of the present invention, suitable and favoured variables in the first component a) of the catalyst are as so described for the same in relation to the process of the first aspect of the present invention.

In the second component b) of the catalyst of formula (III):

Favoured Q is Al.

Suitable monovalent $X^1$, $Y^1$ and $Z^1$ include optionally substituted bulky alkyl, aralkyl other than aryl-substituted methyl and alkenyl, and cycloalkyl (including polycycloalkyl), cycloalkenyl (including polycycloalkenyl) and aryl.

Suitable monovalent $X^1$, $Y^1$ and $Z^1$ also include optionally substituted aryl-substituted methyl. T Suitable and preferred $X^1$, $Y^1$ and $Z^1$ include those corresponding X, Y and Z groups which are so described and which contain at least 5 carbon atoms.

A group of catalyst second (co-catalyst) components of formula (II) consists of those of formula (IV)

$$AlX_3^2 \qquad (IV)$$

wherein $X^2$ is monovalent X as hereinbefore defined.

Suitable and preferred $X^2$ are as so described for monovalent X hereinbefore.

The process of either of the first and second aspects of the present invention comprises the polymerisation of vinylic monomers (including oligomers). Either process is in particular applicable to the solution polymerisation of methacrylic monomers or oligomers.

The term 'polymerisation' herein includes homo- and co-polymerisation, and named monomer species hereinafter include a reference to homo- and co-oligomers of those monomer species.

The catalysts and compositions of the present invention are used in conventional manner. Under the polymerisation process conditions the catalyst a) and co-catalyst b) must be available to effect polymerisation in the polymerisation medium. This may mean that they must be soluble in at least one fluid component of the reaction mixture. Subject to this constraint, either process may be carried out using a number of different embodiments of the catalysts of the second aspect of the invention.

Thus, for example, both the component a) and the co-catalyst component b) are often soluble in a liquid monomer species, or a vehicle (dispersant or solvent) compatible with the monomer(s) and inert in the present process conditions, and which usually contains at least one monomer species.

In general such liquids should not contain labile hydrogen or halogen atoms or activated alkenyl groups.

Examples of suitable inert solvents or vehicles (if desired) include aromatic hydrocarbon solvents, such as benzene, toluene or xylene.

These may be used optionally in admixture with any of the aliphatic hydrocarbon series of solvents, such as alkanes, eg propane, butanes, including n-butane and 2-methylpropane, pentanes, including n-pentane and 2-methylbutane, and hexanes, including n-hexane and 2- and 3-methylpentanes, and mixtures thereof.

The suitability of any given vehicle will be routinely apparent to the skilled man.

The choice of vehicle will also depend to some extent on its phase compatibility with the rest of the reaction mixture, although solubility data are readily available.

A vehicle may also function as an internal coolant and as a recycled heat transfer fluid, by being vaporised by the polymerisation isotherm, and condensed with a heat exchanger and refluxed.

(It is desirable that processes of this invention should be conducted under temperature-controlled conditions, in order to obtain control over the molecular weight distribution of the polymers; further control may be obtained by this method.)

Thus, e.g., at normal atmospheric pressure the boiling points (° C.) of some of the above vehicles are:
propane: −44.5.
3-methylpentane: 63
n-hexane: 68

Corresponding data at other pressures are readily avaliable, e.g., at 0.25 atmos.
2-methylbutane: 28

The choice of vehicle will then depend inter alia on the size of the exotherm, and the acceptable maximum reaction temperature and minimum reaction pressure. The last named will depend to some extent on the boiling point and vapour pressure of the reactants.

These processes thus may be conducted under $5 \times 10^{-3}$ to 50, e.g., 0.1 to 50, atomspheres pressure but normally atmospheric pressure is suitable.

Typically the process will be operated at a dilution of 5 to 70, e.g., 10 to 70% v/v of monomer with respect solvent, often 25 to 65% v/v.

Either of the present processes may also be carried out in bulk.

However, the reaction exotherm tends to reduce the control which may be exercised over the quality of the product.

This is especially the case as regards, e.g., $M_n$, MWD and $T_g$.

In order to optimise this control in bulk polymerisations according to the present invention, it is greatly preferred that the catalyst is prepared and kept before use (if necessary) at below 50° C.

The catalyst is generally used in an amount relative to the monomer(s) to be polymerised corresponding to a molar ratio of at least 1:20, e.g., at least 1:30, generally in lesser amounts. The catalyst: monomer ratio is preferably at 1:1000 to 1:30, e.g., 1:1000 to 1:50.

The ratio of component a) to co-catalyst b) is generally in the molar ratio range of 1:20 to 1:2, more often 1:6 to 1:2.

However, surprisingly we have now found that the components may also be used with advantage in the corresponding molar ratio range of 1:2 to 2:1, e.g., 1:2 to 1:1.

Polymerization reactions of the first aspect of this invention are conducted at temperatures ranging from −20° to 60° C.; a range of 0° to 30° C. is preferred.

Polymerization reactions of the second aspect of this invention may be conducted, for example, at temperatures ranging from −100° C. to 60° C.; a range of 0° to 30° C. is again preferred.

In both cases increased bulkiness of the groups X, Y and Z tends to permit the polymerisation reaction to be operated at higher temperatures, whilst still retaining good product properties, eg $M_n$, MWD and $T_g$.

In both cases the operating temperature may be constrained by the solvent of choice, and vice versa.

It is desirable that processes of this invention should be conducted under anhydrous and oxygen-free conditions, and the water and oxygen content of the monomers, catalysts any solvents minimised.

This should be done in order to obtain control over the molecular weight of the polymers obtained by this method.

It is desirable to ensure that processes of this invention are conducted in atmospheres that have been treated in order to exclude water or oxygen.

Such atmospheres include atmospheres of dried inert gases such as nitrogen or argon.

The catalyst components must be pre-mixed together before being added to the monomer or its solution, or before the monomer or its solution is added to the catalyst mixture.

Often the catalyst is generated by such mixing and used in situ without isolation. No particular restrictions are placed on the order of such subsequent addition.

Additionally, component a) may be prepared and mixed with component b) to generate the catalyst in situ without isolation.

Thus for example (as shown in the Examples hereinafter) (bulky aralkyl)lithium species may be prepared by the addition of aralkenyl species to a (bulky alkyl) lithium, and component b) added directly to the product solution, which in turn is used directly to catalyse a polymerisation.

This order of addition may be reversed, e.g., the (bulky alkyl)lithium may be mixed with the component of formula (II) or (III) and the aralkene added to the mixture in situ without isolation to generate a catalyst of the present invention.

This catalyst is demonstrably different from the combination of the (bulky alkyl)lithium and the component of formula (II) or (III), but not necessarily the same as that resulting from the first order of mixing.

Random compolymers may be prepared by the present processes by using a mixture of suitable monomers in place of the single monomers mentioned above.

As is conventional, the compatibility of the monomers, and the compatibility of their reactivities, for random co-polymerisation may be determined by routine trial.

AB block copolymers may be prepared by a solution process of this invention using two or more monomers. After initially polymerizing the first monomer using a catalyst of the present invention, the second monomer is generally added to the initial product polymer solution in solution in a suitable organic solvent, which is normally the same as the first reation solvent.

ABA and ABC block co-polymers may similarly be prepared conventionally in the present processes.

Functionalised and polyfunctionalised polymers and oligomers may be produced as desired by selective termination of the polymerisation process, in a manner conventional in the anionic polymerisation art.

It is often desirable to remove catalyst residues from the product, in particular to reduce so-called water whitening, and to reduce polymer solution viscosities. This may be effected conventionally by solvent precipitation and filtering off the catalyst from the reaction mixture.

Generally, the desired product polymer may be isolated conventionally from the product solution.

For example it may be isolated by solvent removal in vacuo with the application of heat, or by precipitation with an appropriate vehicle such as methanol, followed by filtering off and drying the product in vacuo with the application of heat as mentioned immediately above.

The good thermal stability of the present products means that temperatures in the range of 40° to 300° C. may be used. Temperatures towards the upper end of the range may be used in flash evaporation to give a molten product, which may be further processed eg as extruded sheet or pelletised.

However if the product polymer is to be used in resins applications e.g., in surface coatings the solvent may often not be removed and/or the precipitated polymer may not be isolated.

The reaction product in solution or dispersion/suspension is then used directly as a base for e.g., a paint formulation. The relatively narrow molecular weight distribution of the present products advantageously tends to confer a relatively lower viscosity at a given solids content on such a formaulation.

Subject to some restrictions (recited below) any vinylic monomer may be polymerised in the present process.

Such suitable monomers exclude those in which the olefinic moiety is substituted by any functional group which can take part in competing reactions.

This is particularly the case where such a group can cause substantial or full suppression of the desired polymerisation reaction.

Such groups include acidic hydrogen atoms, reactive halogen atoms (i.e., generally excluding substituents on aromatics), or an acrylic hydrogen atom.

Typical examples of vinylic monomers which lack such groups and may thus be polymerised in the present processes include:

Subject to some restrictions (recited below) any vinylic monomer may be polymerised in the present process.

Such suitable monomers exclude those in which the olefinic moiety is substituted by any functional group possessing
a) acidic hydrogen atoms,
b) reactive halogen atoms. or
c) an acrylic hydrogen atom.

Typical examples of vinylic monomers which may be polymerised in the present processes include:

$C_{1-4}$ methacrylic acid esters such as methyl methacrylate, ethyl methacrylate, n-propyl methacrylate, isopropyl methacrylate, n-butyl methacrylate, sec-butyl methacrylate, iso- butyl methacrylate and tert.-butyl methacrylate;

other methacrylic acid esters such as cyclohexyl methacrylate, 2-ethylhexyl methacrylate, octyl methacrylate, decyl methacrylate, lauryl methacrylate, docosanyl methacrylate and tricyclo[5,2,1,0$^{2,6}$]dec-3-en-8-yl methacrylate;

polyfunctional (cross-linking) methacrylic polyesters such as glycidyl methacrylate and triethylene glycol dimethacrylate;

other polyfunctional (cross-linking) methacrylic polyesters such as allyl methacrylate;

substituted methacrylic acid esters such as dimethylaminoethyl methacrylate and trimethoxysilyl -ethyl and -propyl methacrylates;

unsaturated nitriles such as methacrylonitrile;

unsaturated imides such as optionally substituted maleimides, e.g., 2,6-dimethyl-N-phenylmaleimide;

aromatic vinyl compounds such as styrene, o-, m-or p-methyl or ethylstyrene, o-, m- or p-methoxystyrene o-methyl or ethylstyrene, o-, m- or p-dimethyl or ethylaminostyrene or m- or p-chlorostyrene; and aliphatic olefinic compounds such as butadiene and isoprene.

Preferred amongst these monomers are methyl methacrylate, n-butyl methacrylate, iso-butyl methacrylate, tert.-butyl methacrylate, 2-ethylhexyl methacrylate, octyl methacrylate, decyl methacrylate, allyl methacrylate and 2,6-dimethyl-N-phenylmaleimide;

Favoured monomers include methacrylonitrile, butadiene, isoprene, styrene, α-methylstyrene and p-chlorostyrene.

Particular monomers include methyl methacrylate. Particular monomers also include butyl methacrylate, 2,6-dimethyl-N- phenylmaleimide, methacrylonitrile, butadiene and styrene.

All these monomers may be used singly or generally in combination.

However, the present processes do not appear to be applicable to all AB or ABA block co-polymers of methacrylate esters with aromatic vinylics or aliphatic olefinics.

Nevertheless, they are applicable to certain AB and ABA block copolymers of this type, including a) AB block copolymers with styrene, butadiene and isoprene, where B is the methacrylate, and b) ABA block copolymers with the same, where A is the methacrylate.

It will be appreciated that the above suitable monomers include precursors of monomers in which the olefinic mciety is undesirably substituted.

That is, they are precursors of olefinic monomers substituted by a functional group which can take part in competing reactions and which thus cannot themselves be polymerised in the present processes.

A suitable precursor monomer may be polymerised in either of the present processes and the polymeric (precursor) product subsequently converted to the desired product.

This offers a route via the present processes to polymers of unsuitable monomers.

For example, any of the foregoing suitable ester monomers such as tert.-butyl methacrylate may be polymerised and the product conventionally hydrolysed in solution to give a methacrylic acid polymer.

The catalyst components a) and co-catalyst components b) are known materials or are preparable analogously to, or are routinely derivable, from known materials.

For example many of the groups X, Y and Z may be introduced to form the compounds of formula (II) by conventional nucleophilic displacement from an aluminium halide.

The synthesis and use of catalysts and the processes of the present invention is illustrated by the following Examples:

EXAMPLES 1 AND 2

Preparation of and Process using

Catalyst comprising Components of General Formulae (I) and(II)

Example 1

Preparation of Catalyst (E.1): tris(iso-butyl)aluminium: tert.-butyllithium (molar ratio 5:1)

To a solution of tri(isobutyl)aluminium (120 mmole) in dry toluene (2580 ml) at 0° C. was added tert.-butyllithium (20 mmoles) in pentane.

Once the tert.-butyllithium addition was completed, the solution was maintained at 0° C. for 30 min.

Example 2

Solution Homopolymerisation using above Catalyst generated in situ by combining Components The catalyst of the present invention is generated as described in Example 1 by the combination of its (first and second) components in an appropriate mutual molar ratio (as hereinbefore described).

It is not generally isolated before use, but the combination is used in situ in the polymerisation medium.

The following conditions are typical for the solution polymerisation of methacrylic monomers.

To the solution of (E.1) prepared in Example 1 and maintained at 0° C. was added dry degassed methyl methacrylate (1280 m, 12 mole) with vigorous stirring over 2 hours.

The polymerisation was terminated after a further 15 min. by the addition of water (0.44 mole).

The resultant viscous polymer solution was poured into trays and dried in vacuo for 6 hours at 25° C., 6 hours at 50° C., and 6 hours at 160° C.

This gave poly(methyl methacrylate) (PMMA) in an 95 to 3800% yield.

$M_n$ 81,000, $M_w$ 104,000. MWD 1.29.

As noted hereinbefore, if the product polymer is to be used in resins applications e.g., in surface coatings the solvent may often not be removed, but the reaction product in solution may be used directly as a base for eg a paint formulation.

EXAMPLE 3

The following catalysts were prepared analogously to Example 1, from the corresponding lithium and aluminium compounds in the molar ratios given in the brackets:

| | |
|---|---|
| tri(iso-butyl)aluminium: (3:1) | tert.-butyllithium (E.2) |
| 3-tri(dicyclopentadienyl)aluminium: tert.- butyllithium (5.5:1) | (E.3) |
| trinorbornenylaluminium (5:1) | tert.-butyllithium (E.4) |
| tri(iso-butyl)aluminium: (1:1) | tert.-butyllithium (E.5) |
| tri(iso-butyl)aluminium: (2:1) | . tert.-butyllithium (E.6) |
| tri(iso-butyl)aluminium: (3:5) | tert.-butyllithium (E.7) |
| tri(iso-butyl)aluminium: (3:2) | tert.-butyllithium (E.8) |
| tri(iso-butyl)aluminium: tert.-butyllithium (2:1:2) | triethylaluminium: (E.9) |

EXAMPLE 4 a) The catalysts of Example 3 were used generally analogously to the process of Example 2, with the following general results, shown in Table 1.

The polymerisation may also be terminated by the addition of methylethylketone, acetone, methanol, ethanol or wet dichloromethane rather than water.

$M_n$ may be controlled to lie between 20,000 and 200,000 and MWD to lie between 1.17 and 1.30.

The $T_g$ of the product is typically some 10 to 15° C. higher than that of equivalent PMMA homopolymer produced by conventional free-radical methods.

The product typically has greater thermal stability, and its weathering and optical clarity are excellent.

TABLE 1

| Catalyst | [MMA]:[Li] | reaction temp °C. | yield % | $M_n$ K | MWD | Tg °C. |
|---|---|---|---|---|---|---|
| (E.2) | 500 | 25 | >90 | 74.15 | 1.44 | 117 |
| (E.1) | 500 | 0 | >90 | 91.2 | 1.38 | 113 |
| (E.1) | 500 | −15 | >90 | 57.5 | 1.17 | 113 |
| (E.1) | 500 | 0 | >90 | 132.0 | 1.23 | |
| (E.1) | 200 | 0 | >90 | 45.7 | 1.28 | 114 |
| (E.1) | 500 | 25 | 80 | 112.2 | 1.82 | 112 |
| (E.1) | 500 | 25 | 95 | 144.5 | 1.90 | 117 |
| (E.1) | 500 | 0 | 100 | 79.4 | 1.23 | 119 |
| (E.1) | 500 | 0 | 100 | 77.6 | 1.26 | |
| (E.2) | 500 | 0 | 92 | 53.7 | 1.17 | |
| (E.3) | 500 | 0 | >90 | 81.3 | 1.29 | |
| (E.2) | 500 | 0 | 93 | 64.6 | 1.48 | |
| (E.1) | 750 | 0 | 100 | 97.7 | 1.26 | |
| (E.2) | 500 | 15 | >90 | 63.1 | 1.29 | |
| (E.1) | 500 | 0 | >90 | 97.7 | 1.17 | |
| (E.4) | 500 | 25 | 26 | 28.0 | 1.22 | |
| (E.5) | 331 | 0 | 95 | 67.6 | 1.20 | |
| (E.7) | 331 | 0 | 94 | 66.1 | 1.90 | |
| (E.5) | 331 | 0 | 90 | 53.7 | 1.78 | |
| (E.8) | 331 | 0 | 95 | 67.6 | 1.20 | |
| (E.9) | 158 | 0 | 100 | 25.7 | 1.10 | |
| (E.9) | 370 | 24 | 100 | 53.7 | 1.18 | |
| (E.9) | 480 | 24 | 100 | 79.4 | 1.44 | | b) The catalysts of Examples 1 and 3 were used generally analogously to the process of Example 2, with different monomer species, the following gneral results shown in Table 2. The polymerisation may also be terminated by the addition of methylethylketone, acetone, methanol, ethanol or wet dichloromethane rather than water.

$M_n$ may be controlled to lie between 20,000 and 200,000 and MWD to lie between 1.1 and 1.4.

TABLE 2

| Catalyst | monomer | [MMA]:[Li] | temp. °C. | yield % | $M_n$ K | MWD |
|---|---|---|---|---|---|---|
| (E.1) | BMA | 100 | 0 | 100 | 28.8 | 1.32 |
| (E.2) | BMA | 200 | 0 | 100 | 33.1 | 1.12 |

BMA = n butyl methacrylate

EXAMPLE 5

The following catalysts are prepared analogously to Example 1 from the corresponding lithium and aluminium compounds:

| | |
|---|---|
| tri-tert.-butylaluminium (E.10) | tert.-butyllithium (5:1) |
| trineopentylaluminium (E.11) | tert.-butyllithium (5:1) |
| tri(iso-butyl)aluminium | distyryldilithium (5:1) |
| (E.12) | |

EXAMPLE 6

The catalysts of Example 5 are used analogously to the process of Example 2.

EXAMPLE 7

The following catalysts were prepared in general analogy to Example 1 from the corresponding lithium and aluminium compounds:

| | |
|---|---|
| tri-isobutylaluminium (E.13) | diisopropylaminolithium (2:1) |
| tri-isobutylaluminium (E.14) | diisopropylaminolithium (1:1) |
| tri-isobutylaluminium (E.15) | diisopropylaminolithium (3:1) |

The lithium compound in solution in toluene was added to the aluminium compound in solution in toluene at 0° C., and the catalyst so prepared was brought to the appropriate polymerisation temperature.

EXAMPLE 8

The catalysts of Example 7 were used in general analogy to the process of Example 2.

All the polymerisations were run on methyl methacrylate in toluene solution at 20% w/w concentration, with the following general results, shown in Table 2.

$M_n$ may be controlled to lie between 20,000 and 200,000 and MWD to lie between 1.07 and 1.40. The $T_g$ of the product is typically some 10° to 15° C. higher than that of equivalent PMMA homopolymer produced by conventional free-radical methods.

The product typically has greater thermal stability, and its weathering and optical clarity are excellent.

TABLE 3

| Catalyst | [MMA]:[Li] | reaction temp °C. | yield % | $M_n$ K | MWD |
|---|---|---|---|---|---|
| (E.13) | 200 | 0 | 100 | 44.7 | 1.15 |
| (E.13) | 200 | 20 | 100 | 46.2 | 1.26 |
| (E.13) | 200 | 40 | 43 | 30.9 | 1.39 |
| (E.13) | 100 | 0 | 100 | 28.6 | 1.15 |
| (E.13) | 200 | 0 | 100 | 44.7 | 1.28 |
| (E.13) | 300 | 0 | 77 | 71.8 | 1.33 |
| (E.14) | 200 | 0 | 86 | 31.9 | 1.35 |
| (E.13) | 200 | 0 | 100 | 44.7 | 1.15 |
| (E.15) | 200 | 0 | 100 | 72.4 | 1.40 |

EXAMPLE 9

The following catalyst was prepared as follows:

| | | |
|---|---|---|
| tri-isobutylaluminium | 3-methyl-4,5-diphenyl- | |
| | pent-2-yllithium (2:1) | (E.16) |

To a solution of diphenylethene (177 microliters, 1 mmole) in toluene (5 ml) was added a solution of sec.-butyllithium in cyclohexane (0.77 ml, 1.3M) at room temperature. The reaction was left for 30 min.

A solution of trisisobutylaluminium in toluene (1 ml, 1M) was added to 3 ml of the product solution at 0° C.

EXAMPLE 10

The catalyst of Example 9 was used analogously to the process of Example 2, on methyl methacrylate in toluene solution at 20% w/w concentration, with the following general results, shown in Table 3.

$M_n$ may be controlled to lie between 20,000 and 200,000 and MWD to lie between 1.07 and 1.40. The $T_g$ of the product is typically some 10° to 15° C. higher than that of equivalent conventional PMMA homopolymer.

The product typically has greater thermal stability, and its weathering and optical clarity are excellent.

TABLE 4

| Catalyst | [MMA]:[Li] | reaction temp °C. | yield % | $M_n$ K | MWD |
|---|---|---|---|---|---|
| (E.16) | 200 | 0 | 100 | 38.0 | 1.16 |

EXAMPLE 11

The following catalysts are prepared analogously to Example 1 from the corresponding lithium and aluminium compounds:

| | |
|---|---|
| triisobutylaluminium (E.17) | diisopropylaminolithium (5:1) |
| triisobutylaluminium (E.18) | diisopropylaminolithium (6:1) |
| triisobutylaluminium (E.19) | diisopropylaminolithium (4:1) |

EXAMPLE 12

The catalysts of Example 11 are used analogously to the process of Example 2.

Examples 13 and 14

In Situ Preparation of Catalyst Component of General Formula (I) followed by In Situ Preparation of and Process using Catalyst comprising Components of General Formulae (I) and (II)

Example 13

Preparation of Catalyst Component (D.20): 4,4-dimethyl 2-phenylpent-2-yllithium, followed by Preparation of Catalyst (E.20): tris(isobutyl)aluminium: (D.20) (molar ratio 2:1)

To a solution of alpha-methylstyrene (0.31 mmole) (previously dried by distillation from calcium hydride) in dry toluene (20 ml) at room temperature was added tert.-butyllithium (0.31 mmoles) in dry toluene (0.18 ml, 0.18M).

Once the tert.-butyllithium addition was completed, the solution was cooled to 0° C., and to the resultant solution was added a solution of trisisobutylaluminium (0.62 mmole) in toluene (0.62ml, 1M).

Once the trisisobutylaluminium addition was completed, the solution was maintained at 0° C. for 15 min.

EXAMPLE 14

Solution Homopolymerisation using above Catalyst generated in situ by combining Components The catalyst of the present invention is generated as described in Example 13 by the combination of its (first and second) components in an appropriate mutual molar ratio (as hereinbefore described).

It is not generally isolated before use, but the combination is used in situ in the polymerisation medium.

The following conditions are typical for the solution polymerisation of methacrylic monomers.

To the solution of (E.20) prepared in Example 13 and maintained at 0° C. was added dry degassed methyl methacrylate (5 ml, 46 mmole) with vigorous stirring over 5 min.

The polymerisation was terminated after a further 3 hr at 0° C. by the addition of methanol (1 ml).

The resultant viscous polymer solution was poured into hexane to precipitate the product, which was dried for 6 hours at 50° C., and 6 hours at 160° C., to yield poly(methyl methacrylate) (PMMA) in a 20% yield. $M_n$ 138,200, MWD 1.74.

EXAMPLES 15 AND 16

In Situ Preparation of Catalyst Component of General Formula (I) followed by In Situ Modification of and Process using Catalyst comprising Components of General Formulae (I) and(II)

EXAMPLE 15

Preparation of Catalyst Precursor (D.21): tert.-butyllithium tris(isobutyl)aluminium: (D.21) (molar ratio 2:1), followed by Preparation of Catalyst (E.21)

To a solution of trisisobutylaluminium (5 mmole) in toluene (5 ml, 1M). cooled to 0° C., was added tert.-butyllithium (2.55 mmoles) in dry pentane 5 ml, 0.18M) at 0° C.

Once the tert.-butyllithium addition was completed, a solution of alpha-methylstyrene (0.153 mmole) (previously dried by distillation from calcium hydride) in dry toluene (20 ml) was added to 4 ml of the resultant solution in toluene (20 ml) at 0° C.

Once the alpha-methylstyrene addition was completed, the solution was maintained at 0° C. for 15 min.

Example 16

Solution Homopolymerisation using above Catalyst generated in situ by combining Components The catalyst (E.21) of Example 15 was used, and the product isolated, as in Example 14, to yield poly(methyl methacrylate) (PMMA) in an 80% yield. $M_n$ 119,800 MWD 1.52

EXAMPLE 17

The following catalyst components a) were prepared analogously to Example 13, starting from the corresponding unsaturated and lithium compounds.

The catalyst was generated analogously to Example 13 from the lithium species product by addition of the corresponding aluminium compounds in the molar ratios given in the brackets:

tri(isobutyl)aluminium: 1,3-bis(4,4-dimethylpentane-
2,2-diyl)benzenedilithium (D.22)   (2.07:1)
(E.22)
((D.22) from 1,3-diisopropen-2-ylbenzene and
tert.-butyllithium)
tri(isobutyl)aluminium: 1,3-bis(4-methylhexane-2,2-
diyl)benzenedilithium (D.23)    (2:1)
(E.23)
((D.23) from 1,3-diisopropen-2-ylbenzene and
sec.-butyllithium)
tri(isobutyl)aluminium: 1,3-bis(4-methylhexane-2,2-
diyl)benzenedilithium (D.24)    (2:1)
(E.24)
((D.24) from 1,3-diisopropen-2-ylbenzene (DIB) and
sec.butyllithium and triethylamine (5% wrt DIB) left in
situ in polymerisation process)
tri(isobutyl)aluminium: 1,3-bis(3-methyl-1-phenyl-
pentane-1,1-diyl)benzene (D.25)    (2:1)
(E.25)
((D.25) from 1,3-bis(1-phenylvinyl)benzene and
sec.-butyllithium)
tri(isobutyl)aluminium: 1,3-bis(3-methyl-1-[4'-
tert.-butylphenyl]pentane-1,1-diyl)benzene (D.26)
                (2:1)        (E.26)
((D.26) from 1,3-bis(1-[4'-tert.-butylphenyl]-
vinyl)benzene and sec.butyllithium)

The following is prepared and used analogously:

tri(isobutyl)aluminium: bis(3,3-dimethyl-1-phenyl-
butane-2,2-diyl)benzene (D.27)   (2:1)
(E.27)
((D.27) from 1,3-bis(1-phenylvinyl)benzene and
tert.-butyllithium)

EXAMPLE 18

The catalysts of Example 17 were used generally analogously to the process of Example 14, with the following general results, shown in Table 5.

$M_n$ may be controlled to lie between 10,000 and 100,000 and MWD to lie between 1.6 and 1.8.

The $T_g$ of the product is typically some 10 to 15° C. higher than that of equivalent PMMA homopolymer produced by conventional free-radical methods. The product typically has greater thermal stability, and its weathering and optical clarity are excellent.

TABLE 5

| Catalyst | [MMA]:[Li] | reaction temp °C. | yield % | $M_n$ K | MWD |
|---|---|---|---|---|---|
| (E.22) | 32 | 0 | 75 | 43.0 | 1.82 |
| (E.23) | 32 | 0 | 80 | 67.2 | 1.72 |
| (E.24) | 32 | 0 | 80 | 48.3 | 1.73 |
| (E.25) | 200 | 0 | 75 | 53.4 | 1.35 |
| (E.25) | 38 | 0 | 80 | 18.5 | 1.72 |
| (E.26) | 52 | 0 | 80 | 53.1 | 1.6 |

EXAMPLE 19

The following catalyst component a) was prepared analogously to Example 15, starting from the corresponding aluminium and lithium compounds in the molar ratios given in the brackets:

The catalyst was modified analogously to Example 15 by addition of the corresponding unsaturated compound.

tri(isobutyl)aluminium:        sec.-butyllithium (D.28)
        (2.07:1)

with addition of 1,4-di(1-phenylvinyl)benzene in same molar ratio a in Example 15 to give (E.28)

EXAMPLE 20

The catalyst of Example 19 (E.28) was used generally analogously to the process of Example 16, to yield poly(methyl methacrylate) (PMMA) in a 100% yield. $M_n$ may be controlled to lie between 2,000 and 20,000. $M_n$ 8,400, MWD 1.6.

EXAMPLE 21

The following catalysts were prepared analoguously to Example 1:

| tri(isobutyl)aluminium (2:1) | sodium methoxide (E.29) |
|---|---|
| di(isobutyl)-2,6-ditert.-butylphenoxyaluminium tert.-butyllithium   (2:1)   (E.30) | |
| di(isobutyl)-2,6-ditert.-butylphenoxyaluminium tert.-butyllithium   (3:1)   (E.34) | |
| di(isobutyl)-2,6-ditert.-butylphenoxyaluminium tert.-butyllithium   (5:1)   (E.35) | |
| di(isobutyl)-2,6-ditert.-butyl-4-methylphenoxyaluminium tert.-butyllithium   (2:1)   (E.36) | |
| di(isobutyl)-2,6-ditert.-butyl-4-methoxyphenoxy-aluminium   tert.-butyllithium   (2:1)   (E.37) | |

EXAMPLE 22

The catalysts of Example 21 were used generally analogously to the process of Example 2, with the following general results, shown in Table 6.

$M_n$ may be controlled to lie between 2,000 and 200,000 and MWD generally to lie between 1 and 1.6.

TABLE 6

| Catalyst | [MMA]:[Li] | reaction temp °C. | yield % | $M_n$ K | MWD |
|---|---|---|---|---|---|
| (E.29) | 200 | 0 | 15 | 143.7 | 1.55 |
| (E.30) | 200 | 0 | 100 | 22.4 | 1.04 |
| (E.30) | 50 | 0 | 100 | 21.6 | 1.05 |
| (E.30) | 200 | 50 | 19 | 5.4 | 1.09 |
| (E.30) | 200 | 25 | 100 | 43.3 | 1.32 |
| (E.30) | 12 | 0 | 50 | 3.5 | 1.41 |
| (E.34) | 1000 | 0 | 82 | 89.0 | 1.93 |
| (E.35) | 1000 | 0 | 100 | 122.0 | 1.36 |
| (E.36) | 299 | 0 | >90 | 38.9 | 1.31 |
| (E.37) | 200 | 0 | 100 | 23.9 | 1.09 |

EXAMPLES 23 and 24

Component of General Formula [I] followed by In Situ Modification of and Process using Catalyst comprising Components of General Formulae (I) and(II)

Example 23

Preparation of Catalyst Precursor (D.31):
tert.-butyllithium tris(isobutyl aluminium: (D.31) (molar ratio 1:2), followed by Preparation of Catalyst (E.31)

To a solution of trisisobutylaluminium (5 mmole) in toluene (5 ml, 1M), cooled to 0° C., was added tert.-butyllithium (2.5 mmoles) in dry pentane (1.5 ml, 0.18M) at 0° C.

Once the tert.-butyllithium addition was completed, a solution of 1,6-bis(N',N'-bisisopropylcompl ureido)hexane (0.31 mmole) in dry toluene (50 ml) was added to 1.6 ml of the resultant solution in toluene at 0° C.

Once the addition was completed, the solution was maintained at 0° C. for 120 min.

Example 24

Solution Homopolymerisation using above Catalyst generated in situ by combining Components The catalyst (E.31) of Example 23 was used, and the product isolated, as in Example 14, to yield poly(methyl methacrylate) (PMMA) in a 50% yield.
$M_n$ 28,800, MWD 1.95.

EXAMPLES 25 AND 26

The catalysts (E.32) and (E.33):

| | |
|---|---|
| triethylaluminium (2:1) | tert.-butyllithium (E.32) |
| triethylboron (2:1) | tert.-butyllithium (E.33) | were prepared analogously to Example 1 and used analogously to Example 2, to yield poly(methyl methacrylate) (PMMA) in a 95% yield.
(E.32) $M_n$ 19,600, MWD 1.30.

EXAMPLE 27

Random Solution Copolymerisation using above Catalyst generated in situ by combining Components The catalyst of the present invention is generated as described in Example 1 by the combination of its (first and second) components in an appropriate mutual molar ratio (as hereinbefore described).

It is not generally isolated before use, but the combination is used in situ in the polymerisation medium.

The process conditions described in Example 2 for the solution homopolymerisation of methacrylic monomers are generally applicable.

These were used for the solution copolymerisation of methacrylic monomers, but using a solution of a mixture of the relevant monomers in place of that of a single monomer.

Reaction was terminated by the addition of methylethylketone rather than water.

The Catalysts of Example 3 were used in this way using methyl methacrylate and n-butyl methacrylate.

The copolymerisations were carried out at 0° C., with the following general results shown in Table 7.

TABLE 7

| Catalyst | [MMA]:[BMA] | [monomers]:[Li] | yield % | $M_n$ K | MWD |
|---|---|---|---|---|---|
| (E.5) | 52.8:47.2 | 150 | 94 | 35.5 | 1.07 |
| (E.6) | 52.5:47.2 | 150 | 90 | 47.9 | 1.15 |
| (E.5) | 53.1:46.9 | 150 | >90 | 39.8 | 1.17 |
| (E.5) | 26.8:73.2 | 125 | >90 | 44.7 | 1.33 |
| (E.2) | 50:50 | 150 | 100 | 35.5 | 1.41 |
| (E.2) | 46:54 | 150 | 100 | 41.7 | 1.41 |
| (E.3) | 50:50 | 150 | 100 | 43.6 | 1.17 |
| (E.3) | 75:25 | 150 | 100 | 49.0 | 1.38 |

Example 28

The catalysts of Example 5 are used analogously to the process of Example 27.

EXAMPLE 29

AB Block Copolymerisation using above Catalyst generated in situ by combining Components The catalyst of the present invention is generated as described in Example 1 by the combination of its (first and second) components in an appropriate mutual molar ratio (as hereinbefore described).

It is not generally isolated before use, but the combination is used in situ in the polymerisation medium.

The process conditions described below are generally applicable and were used for the solution AB block copolymerisation of methacrylic monomers:

A solution of (E.3) (1.8 mmole Al; 52.4 ml) was prepared as in Example 1 and maintained at 0° C. for 10 min.

Dry degassed methyl methacrylate (10 ml, 92 mmole) was then added to the catalyst solution with vigorous stirring over 5 min, maintaining the temperature of the mixture at 0° C.

After a further 30 min at 0° C., dry degassed n-butyl methacrylate (15 ml, 94 mmole) was added with vigorous stirring over 5 min, maintaining the temperature of the mixture at 0° C.

Polymerisation was terminated after a further 60 min. at 0° C. by the addition of wet dichloromethane.

The resultant viscous polymer solution was poured into a large volume of methanol to precipitate the polymer, which was filtered off and dried in vacuo for 6 hours at 80° C.

This gives poly(methyl methacrylate) (PMMA): poly(n-butyl methacrylate) (PBMA) AB block copolymer, 95 to 100% yield.

As noted hereinbefore, if the product polymer is to be used in resins applications e.g., in surface coatings the precipitated polymer may not be isolated.

In such case, the reaction product in dispersion/suspension may be used directly as a base for e.g., a paint formulation.

The catalysts of Example 3 were used in this way using sequential AB block mixtures of methyl methacrylate and n-butyl methacrylate.

All the copolymerisations were carried out at 0° C., with the following general results shown in TABLE 8.

TABLE 8

| Catalyst | [MMA]:[BMA] theory | [MMA]:[BMA] actual | [monomers]:[Li] | yield % | $M_n$ K | MWD |
|---|---|---|---|---|---|---|
| (E.3) | 50:50 | 50:50 | 300 | 97 | 86 | 1.15 |
| (E.3) | 94:6 | 92:8 | 320 | 92 | 48.6 | 1.10 |
| (E.3) | 94:6 | 92:8 | 320 | 95 | 67.2 | 1.12 |

EXAMPLE 30

The catalysts of Example 5 are used analogously to the process of Example 29.

EXAMPLE 31

ABA Block Copolymerisation using above Catalyst generated in situ by combining Components The catalyst of the present invention is generated as described in Example 1 by the combination of its (first and second) components in an appropriate mutual molar ratio (as hereinbefore described).

It is not generally isolated before use, but the combination is used in situ in the polymerisation medium.

The process conditions described below are generally applicable and were used for the solution ABA block copolymerisation of methacrylic monomers:

A solution of (E.3) (1.8 mmole Al; 52.4 ml) was prepared as in Example 1 and maintained at 0° C. for 10 min.

Dry degassed methyl methacrylate (10 ml, 92 mmole) was then added to the catalyst solution with vigorous stirring over 5 min, maintaining the temperature of the mixture at 0° C.

After a further 20 min at 0° C., dry degassed n-butyl methacrylate (4 ml, 25 mmole) was added.

Addition was made with with vigorous stirring over 5 min, maintaining the temperature of the mixture at 0° C.

After a further 20 min at 0° C., dry degassed methyl methacrylate (10 ml, 92 mmole) was added.

Polymerisation was terminated after a further 20 min. at 0° C. by the addition of wet dichloromethane.

The resultant viscous polymer solution was poured into a large volume of methanol to precipitate the polymer, which was filtered off and dried in vacuo for 6 hours at 80° C., to yield poly(methyl methacrylate) (PMMA): poly(n-butyl methacrylate) (PBMA) ABA block copolymer, 75 to 100% yield.

As noted hereinbefore, if the product polymer is to be used in resins applications e.g., in surface coatings the precipitated polymer may not be isolated.

In such case, the reaction product in dispersion/suspension may be used directly as a base for e.g., a paint formulation.

The catalysts of Example 3 were used in this way using a similar sequential ABA block mixture of methyl methacrylate and n-butyl methacrylate.

The catalysts of Example 21 were used in this way using a similar sequential ABA block mixture of methyl methacrylate and trimethoxysilylpropyl methacrylate. (TMA)

All the copolymerisations were carried out at 0° C., with the following general results shown in Table 9.

TABLE 9

| Catalyst | [MMA]: [BMA] theory | | [MMA]: [BMA] actual | | [monomers]: [Li] | yield % | $M_n$ K | MWD |
|---|---|---|---|---|---|---|---|---|
| (E.3) | 88:12 | 85:15 | 330 | 78 71 | | 1.12 | | |
| (E.3) | 89:11 | 89:11 | 350 | 95 51.5 | | 1.27 | | |

| Catalyst | [MMA]: [TMA] theory | [MMA]: [TMA] actual | [monomers]: [Li] | yield % | $M_n$ K | MWD |
|---|---|---|---|---|---|---|
| (E.36) | | 84:16 | 39 | 100 | 9.5 | 1.45 |

EXAMPLE 32

The catalysts of Example 5 are used analogously.

EXAMPLE 33

Bulk Polymerisation Process using Catalyst comprising Components of General Formulae (I) and(II) generated in situ by combining Components The catalyst of the present invention is generated as described in Example 1 by the combination of its (first and second) components in an appropriate mutual molar ratio (as hereinbefore described).

It is not generally isolated before use, but the combination is used in situ in the polymerisation medium.

The following conditions are typical for the bulk polymerisation of methacrylic monomers.

The solution of (E.3) prepared in Example 1 and maintained at 0° C. (0.4 ml) was added rapidly by syringe to dry degassed methyl methacrylate (5 ml) (molar ratio MMA:Li 300:1) in a Schlenk tube at 0° C. under nitrogen with vigorous stirring.

After immediate and rapid exothermic polymerisation, the product was dissolved in methylene chloride (30 ml), precipitated into a lage excess of hexane, and dried in vacuo for 6 hours at 25° C., 6 hours at 120° C., to yield poly(methyl methacrylate) (PMMA) in an 83 % yield.

Different concentrations of catalyst were used generally analogously to the above process.

The catalysts (E.30) and (E.36) were also used analogously.

The general results are shown in Table 10.

$M_n$ may be controlled to lie between 15,000 and 200,000 and MWD to lie between 1.67 and 2.80.

TABLE 10

| Catalyst | monomer | [MMA]: [Li] | yield % | $M_n$ K | MWD |
|---|---|---|---|---|---|
| (E.3) | MMA | 150 | 76 | 32.9 | 2.45 |
| (E.3) | MMA | 300 | 79 | 46.5 | 1.91 |
| (E.3) | MMA | 500 | 68 | 58.8 | 2.28 |
| (E.3) | MMA | 600 | 82 | 143.8 | 2.20 |
| (E.3) | MMA | 1200 | 77 | 148.4 | 2.33 |
| (E.30) | MMA | 200 | 70 | 28.1 | 1.77 |
| (E.30) | MMA | 100 | 70 | 28.1 | 1.65 |
| (E.30) | MMA | 397 | 83 | 61.1 | 1.60 |
| (E.30) | MMA | 397 | 85 | 58.7 | 1.60 |
| (E.36) | MMA | 395 | 82 | 49.5 | 1.44 |
| (E.36) | MMA | 395 | 85 | 38.9 | 1.54 |

The following catalysts are used analogously to this Example 33: (E.2) to (E.9).

EXAMPLE 34

The catalysts of Examples 1 and 3 are used generally analogously to the process of Example 33 with a different monomer species, viz BMA=n-butyl methacrylate

EXAMPLE 35

The catalyst (E.3) was also used analogously to Example 2 to polynerise 2,6-dimethyl-N-phenylmaleimide (DPM).

[DPM]:[Li] 34, $M_n$ 1,000, MWD 1.43.

EXAMPLE 36

Bulk Random Copolymerisation Process using Catalyst comprising Components of General Formulae (I) and (II) generated in situ by combining Components The catalyst (E.3) generated as described in Example 1 was used generally analogously with Example 33, but to polymerise a combination of DPM (1.48 g, 7.5 mmole) dissolved in MMA (5.52 mmole) in place of MMA.

The following results are typical for the bulk random copolymerisation of such monomers.

[DPM]:[Li] 172, $M_n$ 17,900. MWD 3.19.

EXAMPLE 37

Preparation of Catalyst

The following catalyst (with the component molar ratio given in brackets) was prepared as in Example 1: tri(isobutyl)aluminium: tert.-butyllithium, molar ratio 2.9:1 (E.37)

EXAMPLE 38

Polymerisation of Methyl Methacrylate without Reflux of n-Pentane Coolant

To the solution of (E.8) prepared in Example 1 in a round bottom flask fitted with a solid carbon dioxide (non-reflux) condenser and an air driven turbo-stirrer, pre-cooled to 0° C. and under a pressure of 25 mbar dry nitrogen, a dry degassed solution of methyl methacrylate (30 ml, 281 mmole) in n-pentane (68 ml, 583 mmole) was added over 30 min with vigorous stirring. Volatiles from the reaction flask were condensed in the condenser and collected separately from the reaction flask.

The rate of addition of the monomer solution and the rate of evaporation from the reaction mixture were controlled such that the heat of evaporation and the reaction exotherm were equal and the temperature of the reaction mixture was maintained at 0° C. The polymerisation was terminated after a further 60 min by the addition of methanol (0.5 ml).

The resultant polymer solution was poured into excess methanol to precipitate the polymer.

EXAMPLE 39

Polymerisation of Methyl Methacrylate without Reflux of n-Pentane Coolant This was carried out as for Example 38, but using the solution of (E.2) described in Example 1.

EXAMPLE 40

Polymerisation of Methyl Methacrylate with Reflux of n-Pentane Coolant

The solution of (E.2) prepared in Example 1 and dry, degassed n-pentane (15 ml) was held in a round bottom flask fitted with a solid carbon dioxide (reflux) condenser and an air driven turbo-stirrer, pre-cooled to 0° C. and under a pressure of 20 mbar dry nitrogen.

Dry, degassed methyl methacrylate (30 ml, 281 mmole) was added over 20 min with vigorous stirring.

Volatiles from the reaction flask were condensed in the condenser and refluxed to the reaction flask. The rate of addition of the monomer and the rate of evaporation from the reaction mixture were controlled such that the heat of evaporation and the reaction exotherm were equal and the temperature of the reaction mixture was maintained at 0° C. The polymerisation was terminated after a further 60 min by the addition of water (0.5 ml).

The resultant polymer solution was poured into excess methanol to precipitate the polymer.

EXAMPLE 41

Polymerisation of Methyl Methacrylate without Reflux of n-Butane Coolant

This was carried out as for Example 38, but using the solution of (E.2) described in Example 1 and using n-butane (50 ml) as the coolant.

EXAMPLE 42

Polymerisation of Methyl Methacrylate with Reflux of Toluene Coolant

To the solution of (E.37) prepared in Example 1 was held in a round bottom flask fitted with a solid carbon dioxide (reflux) condenser and an air driven turbo-stirrer, pre-cooled to 0° C. and under a pressure of 8 mbar dry nitrogen.

Dry, degassed methyl methacrylate (50 ml, 467 mmole) was added.

Addition took place over 8 min with vigorous stirring.

Volatiles from the reaction flask were condensed in the condenser and refluxed to the reaction flask. The rate of addition of the monomer and the rate of evaporation from the reaction mixture were controlled such that the heat of evaporation and the reaction exotherm were equal and the temperature of the reaction mixture was maintained at about 0° C.

The polymerisation was terminated after a further 60 min by the addition of water (0.5 ml).

The resultant polymer solution was poured into excess methanol to precipitate the polymer.

EXAMPLE 43

Polymerisation of Methyacrylate with Reflux of Toluene Coolant

This was carried out as for Example 42, but using the solution of (E.4) described in Example 1 and adding the monomer at once, giving a rise in temperature to a maximum of 10° C. The results of Examples 38 to 43 are summarised in the following Table 11.

TABLE 11

| Example | Coolant | pressure mbar | $M_n$ K | MWD | Yield % |
|---|---|---|---|---|---|
| 38 | n-pentane | 25 | 30.9 | 1.31 | 82 |
| 39 | n-pentane | 25 | 53.7 | 1.16 | 93 |
| 40 | n-pentane | 20 | 112.2 | 1.20 | 100 |
| 41 | n-butane | 330 | 44.7 | 1.15 | 80 |
| 42 | toluene | 8 | 87.1 | 1.23 | 95 |
| 43 | toluene | 8 | 55.0 | 1.45 | 95 |

EXAMPLE 44

Removal of Catalyst Residues

Catalyst residues may be removed from the polymer product of any of the foregoing solution polymerisation Examples as follows:

At the end of the polymerisation, typically with 20-30% solids content, the reaction is terminated under nitrogen with an excess of ethanol:carbon tetrachloride (1:1 v/v). The mixture is stirred for 16 hr at 25° C., and then warmed at 50° C. for 5 hr.

Insoluble material deriving from the catalyst is formed during this time, and is removed by sinter filtration (×3). The efficiency of catalyst removal is >99.5%.

The relatively narrow molecular weight distribution of the present products advantageously tends to confer a relatively lower viscosity at a given solids content on such a formulation.

EXAMPLE 45

Preparation of Surface Coating Formulation Comprising a Product of the Present Process; Viscosity Testing; Fim Evaluation Surface coating formulations of the following polymers of the present invention (without removal of catalyst residue as in Example 44) were made up at varying concentrations in toluene:

| Polymer | Composition, wt % | | $M_n$, K | MWD |
|---|---|---|---|---|
| | MMA | BMA | | |
| 1 | 38 | 62 | 39.8 | 1.17 |
| 2 | 100 | | 25.3 | 1.41 |

The solids/viscosity profile of the polymers in solution was determined on a Brookfield viscometer at 25° C., with the following results for polymer 1:

| solids content, wt % | viscosity, cps |
|---|---|
| 30 | 110 |
| solids content for 100 cps viscosity: 30 wt % | | thixotropic behaviour

Removal of the catalyst residues as in Example 44 (to the level of Al 80 ppm, Li 1 ppm in polymer 1) gave the following results:

| Polymer | solids content, wt % | viscosity, cps |
|---|---|---|
| 1 | 30 | 80 |
| | solids content, wt %, for 100 cps viscosity: | |
| 1 | 31.2 | |
| 2 | 51.8 | |

Newtonian behaviour

Films coated down from the above solutions to exhibit good adhesion on a variety of substrates in the cross-hatch test. In this test, the dry film is scored in a cross-hatch, and an adhesive tape is applied firmly to the scored film, and then peeled back.

A rating of 5B indicates good adhesion, where no film is removed from the substrate, OB indicates that most of the film is removed. On styrene and phosphated steel ratings of 5B were achieved, and 3B on aluminium.

We claim:

1. A process for the addition polymerisation of a methacrylic acid ester monomer(s) to yield a polymer having a syndiotacticity of less than 85%, said process being conducted at a temperature in the range of from −20° to 60° C. and comprising contacting the monomer(s), optionally in the presence of a hydrocarbon solvent/vehicle which is inert in the polymerisation process conditions, with a catalyst composition consisting of the product formed on admixing:

(a) a first component of empirical formula:

$$MT \qquad \text{I}$$

wherein
M is Li; and
T is a bulky hydrocarbyl group which (1) contains at least 4 carbon atoms, (2) is optionally substituted by one or more pendent substituents and (3) is inert in the polymerisation process conditions; and (b) a second component of empirical formula:

$$Q(X_s)(Y_n)(Z_p) \qquad \text{II}$$

wherein
Q is Al;
m, n and p are each O or an integer such taht $(m+n+p)=3$; and
X, Y and Z are each independently optionally substituted bulky hydrocarbyl groups, or
X, and Y together are an optionally substituted hydrocarbadiyl group, and Z is an optionally substituted bulky hydrocarbyl group,
all of which groups contain at least 4 carbon atoms and are inert in the polymerisation process conditions.

2. A process as claimed in claim 1, wherein polymerisation of the monomer(s) is carried out in the presence of a hydrocarbon solvent/vehicle which is inert in the polymerisation process conditions.

3. A process as claimed in claim 1, wherein the process is conducted at a temperature in the range of from 0° to 30° C.

4. A process as claimed in claim 1, wherein at least one of X, Y and Z is substituted by a hetero-atom which is directly bonded to Q.

5. A process as claimed in claim 4, wherein the hetero-atom is O.

6. A process as claimed in claim 1, wherein each of X, Y and Z is independently an iso-butyl group or a 2,6-bulkily substituted phenoxy group which is also optionally substituted in the 4 position of the phenyl nucleus.

7. A process as claimed in claim 1, wherein T is unsubstituted.

8. A process as claimed in claim 7, wherein T is tert-butyl.

9. A process as claimed in claim 1, wherein the molar ratio of component (a): component (b) is in the range of from 1:2 to 2:1.

10. A process as claimed in claim 1, wherein two or more methacrylic acid ester monomer charges are polymerised in sequence to yield a block copolymer.

* * * * *